April 23, 1963
H. F. EVERETT
3,086,514
STROKE RATE INDICATOR FOR AN EXTRACORPOREAL
BLOOD CIRCULATION SYSTEM
Filed Oct. 1, 1959
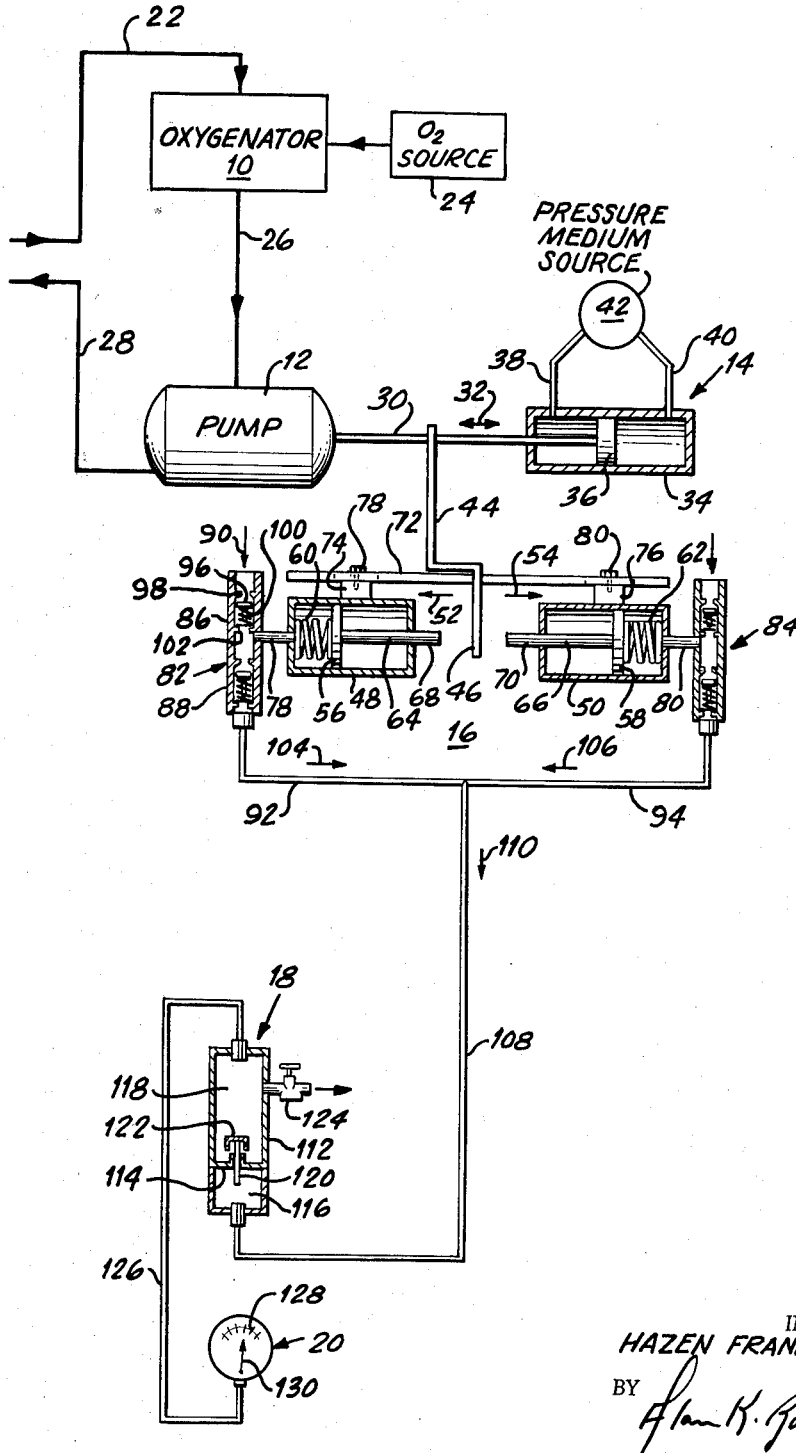
INVENTOR.
HAZEN FRANK EVERETT
BY
ATTORNEY

United States Patent Office 3,086,514
Patented Apr. 23, 1963

3,086,514
STROKE RATE INDICATOR FOR AN EXTRACORPOREAL BLOOD CIRCULATION SYSTEM
Hazen Frank Everett, Hillsdale, N.J., assignor to The Foregger Company, Inc., Roslyn Heights, N.Y.
Filed Oct. 1, 1959, Ser. No. 843,743
8 Claims. (Cl. 128—2.05)

This invention relates to extracorporeal blood circulation systems and, more particularly, to stroke rate indicators for such systems. The invention also relates to apparatus for indicating the frequency cycles of oscillating or reciprocating mechanisms. In addition, the invention relates to methods associated with extracorporeal blood circulation systems and the like and to methods for measuring and indicating frequencies and frequency changes of mechanical movements.

Surgical techniques and requirements have led to the development of methods and apparatus providing for performing the functions of the heart and lungs externally of patients upon whom operations are being performed. Quite generally, this involves detouring the flow of blood around the patient's heart and passing it instead to an oxygenator externally of the body whereat the blood is exposed to oxygen and is oxygenated. Further, the blood is then pumped back into the body by a device which acts as a ventricle and simulates a pulse so that normal circulatory functions are maintained.

In one of its aspects, this invention is concerned with the measuring and indicating of the simulated pulse count so as to provide the surgeon or technician with information whereby he may determine that the apparatus is operating properly or that certain corrective steps are necessary. The provisions of the invention in this regard are, however, suitable for use in other types of apparatus and with other techniques as will become apparent hereinafter.

One object of this invention is to provide, for use in a non-electric extracorporeal system as well as in other such systems, a stroke rate indicator adapted to operate without requiring electrical power. This, as will be readily appreciated, avoids the dangers inherent in employing electrical power in closed oxygen containing systems. Moreover, it avoids the dangers which can arise due to electrical power failures during surgery.

Another object of the invention is to provide an improved stroke rate indicator, for extracorporeal systems, which is especially adapted for use in a compact portable arrangement and which is reliable as well as readily operated.

Still another object of the invention is to provide a pneumatically operated stroke rate indicator of mechanical oscillations.

A further object of the invention relates to the provision of an indicator capable of indicating the cyclic period of a reciprocating system such as might be employed, for example, in simulating a pulse. Still further, the invention has as an object the provision of an improved means for indicating the frequency of oscillation of a system which oscillates back and forth along a straight line while avoiding the need to convert this linear movement to a rotary movement or any other different type of mechanical movement.

In achieving the above and other of its objectives, the invention, according to one of its preferred embodiments, contemplates employing the reciprocating drive of a pulse simulator or ventricle to actuate a pump or the like which discharges a pressure medium in proportion to the frequency of oscillation of said reciprocating drive. The said discharge is then measured and indicated to provide an indication of said frequency.

These provisions enable the ascertaining of stroke rate without recourse to electrical devices, tachometers and so forth and, in so doing, achieve various of the objectives of the invention.

With respect to methods of the invention, these generally relate to the converting of a mechanical oscillation into a pressure or volumetric discharge which is proportional to the frequency of the oscillation and the measuring and/or indicating of the pressure or discharge.

Advantageously, the provisions of the invention entail employing simple components at well below their rated capabilities so that the resulting apparatus is enabled to operate without need for repair and maintenance.

Other objects and features of the invention will be apparent from the following detailed description as illustrated in the accompanying drawing in which the sole FIGURE illustrates diagrammatically an extracorporeal blood circulation system having a stroke rate indicator provided in accordance with a preferred embodiment of the invention.

In the drawing is illustrated a blood circulation system comprising generally an oxygenator 10, a pump 12, a pump driving mechanism 14, a stroke rate indicator mechanism 16, a snubber 18, and a dial or gauge 20.

The oxygenator 10 is a means adapted for receiving the blood of a patient being operated upon and for exposing this blood to oxygen for purposes of oxygenating the same. For these purposes the oxygenator 10 is provided with an input line 22 which is coupled by known surgical techniques to the circulatory system of a patient upon whom an operation is being performed. Additionally, there is coupled to the oxygenator 10 a source of oxygen 24. Oxygenated blood passes from the oxygenator 10 by means of the line 26.

As is known, the oxygenator 10 simulates the functioning of the lungs of the patient. There are various known types of oxygenators which may be employed in accordance with the invention and there may be used by way of example the oxygenators disclosed in Patent 2,702,035 of February 15, 1955 or in Patent 2,693,802 of November 9, 1954.

Coupled to the other end of line 26 for receiving the oxygenated blood and simulating the function of the ventricles of the patient is the pump 12. The pump 12 is provided with an output line 28 which, by means of known surgical techniques, is also coupled to the circulatory system of the patient upon whom the operation is being performed. As is conventional, the lines 22 and 28, and the oxygenator 10 and pump 12, are incorporated into the circulatory system of the patient so as to assume the duties normally performed by the heart and lungs.

The pump 12 may be any conventional type of pump such as illustrated in Patent 2,689,565 of September 21, 1954 or in Patent 2,832,294 of April 29, 1958. However, I prefer to employ a pump which performs a pumping operation and simulates a pulse in response to a mechanical reciprocating force applied thereto. Any conventional type of pump may be employed provided that suitable arrangement is available for pumping blood via the line 26 through the line 28 in pulsed manner.

Connected to the pump 12 is a rigid rod 30 adapted for being reciprocated or oscillated back and forth in the directions indicated by the double-headed arrow 32. The function of the rod 30 is to couple the pump drive 14 to the pump 12 so as to transmit a mechanical reciprocating force originating in the pump drive to said pump.

The pump drive 14 comprises a cylinder 34 with a double acting piston 36 slidably accommodated therein and rigidly connected to the rod 30. To opposite extremities of the cylinder 34 are connected lines 38 and 40 which are adapted to feed a pressure medium to the chambers in the cylinder and to discharge said medium therefrom. A conventional source 42 of a pressure medium is coupled to the lines 38 and 40 and in known manner alternately causes a pressure medium to be fed to and discharged from the respective chambers on opposite sides of the piston 36 to effect a reciprocating motion of the latter.

Rigidly mounted on the rod 30 is an arm or like means 44 which partakes of the reciprocating movement of the rod 30. The arm 44 includes a counter-operating extremity 46, the function of which will be indicated in greater detail hereinafter.

Stroke rate indicator mechanism 16 comprises cylinders 48 and 50 which are operatively disposed along the path of travel of the extremity 46 as indicated by arrows 52 and 54. In cylinders 48 and 50 are slidably disposed pistons 56 and 58. Pistons 56 and 58 are normally urged toward each other by means of springs 60 and 62. Connected to the pistons 56 and 58 are rods 64 and 66 which are directed towards each other in a colinear arrangement. Rods 64 and 66 respectively include extremities 68 and 70 extending outwardly of cylinders 48 and 50 and located directly in the path of movement of extremity 46 of arm 44.

I have considered a more sophisticated mounting arrangement for the cylinders 48 and 50, but for purposes of illustrating the functioning of the pulse counter of my invention, it is sufficient to indicate that the cylinders 48 and 50 are adjustably mounted on a support rod 72 by means of slidable brackets 74 and 76 which may be fixed in position by nuts 78 and 80. The purpose of slidably mounting the cylinders is to enable a constant displacement of the pistons 56 and 58 in response to engagement by the arm 44 even though the length of stroke of the rod 30 might be made adjustable. In other words, I prefer that the discharge from the cylinders 48 and 50 be made dependent upon the frequency of oscillation of the rod 30 and not upon the magnitude of the stroke thereof. I therefore adjust the positions of cylinders 48 and 50 in accordance with the magnitude of the stroke of rod 30 so that the discharge of cylinders 48 and 50 is dependent solely upon the number of times extremities 68 and 70 are engaged by extremity 46 per unit time.

The discharges of cylinders 48 and 50 are respectively accommodated by lines 78 and 80, each of these lines being coupled to a valve arrangement 82 and 84. Each of these valve arrangements comprises an identical positioning of the same components and hence only valve arrangement 82 will be next described.

Valve arrangement 82 consists of two one way valves 86 and 88 with valve 86 providing for the admission of ambient air into cylinder 48 as indicated by arrow 90. Valve 88 provides for the discharge of air from the cylinder 48 as caused by the displacement of piston 56. Valve 88 provides that the air discharged from cylinder 48 can proceed in one direction only into line 92 of which a counterpart, line 94, is connected to valve arrangement 84.

Each of the valves comprises a valve head 96 engageable with a valve seat 98 and urged thereagainst by a spring 100 seated against a shoulder 102. This arrangement in known manner provides for a unidirectional flow of air in a determinable direction.

From what has been stated above, it will be clear that cylinders 48 and 50 are charged with ambient air by means of a one way valve arrangement and that the charged air is discharged via one way valve arrangements into lines 92 and 94, respectively. The direction of the air in lines 92 and 94 is indicated by arrows 104 and 106.

The pumped air then proceeds via line 108 in the direction indicated by arrow 110 and passes to the snubber 18 noted above.

Due to the pumping actions of pistons 56 and 58 in cylinders 48 and 50, a pulsating pressure results in line 108. This pulsating pressure is undesirable for purposes of clearly indicating operational conditions and it is desirable that the flow of air be modified to remove pulsations therefrom. Snubber 18 is provided to achieve this result.

Snubber 18 comprises a cylinder 112 divided by a partition 114 into an input chamber 116 and an output chamber 118. Passing through the partition 114 so as to communicate said chambers with one another is a vertical tube 120. Loosely seated on top of vertical tube 120 is a cap 122 resting on said tube under the influence of gravity alone. The air passing through tube 120 displaces cap 122 upwardly, the cap being prevented from falling off tube 120 by guide means (not shown). This snubbing operation makes smooth the pressure pulsation in the air flow in the system and adapts the air flow for providing indications of the frequency of oscillation of the rod 30.

A bleeder 124 is coupled to chamber 118 in order to prevent air pressure from simply building up. Bleeder tube 124 is shown as being adjustable, but is normally adjusted for purposes of set up only and then mounted in fixed attitude in order to bleed off a fixed percentage of the air arriving at chamber 118. The pressure of air in chamber 118 is therefore a direct indication of the volume of air pumped out of cylinders 48 and 50 by means of pistons 56 and 58.

This pressure is communicated via line 126 to the indicator or pressure gauge 20 which, by means of a scale 128 and a pointer 130 visually indicates the pressure in chamber 118. Scale 128, instead of being calibrated in pressure units, is instead calibrated in terms of stroke rate, stroke rate having a direct proportional relationship to the oscillation of rod 30.

From what has been stated above, it will be evident that pump 12 is the pulse simulator or ventricle of the system and that the stroke rate depends upon the rate of oscillation of rod 30. Since rod 44 is rigidly affixed to the rod 30, pistons 56 and 58 are displaced in accordance with the movement of said rod. Inasmuch as the positions of cylinders 48 and 50 are adjusted to the magnitude of the stroke of rod 30, the amount of air discharged from cylinders 48 and 50 depends exclusively on the number of engagements of extremities 68 and 70 by extremity 46. The volume of air passing through line 108 is therefore dependent upon the cyclical period of oscillation or reciprocation of rod 30 and is thus dependent upon the stroke rate effected by pump 12. The volume of air passing through line 108 directly controls the pressure in chamber 118 and an indication of this pressure therefore correlates with the stroke rate of the system.

In accordance with one of its aspects, the invention may be considered as providing an improvement in an extracorporeal blood circulation system wherein a pump is coupled to an oxygenator for pumping oxygenated blood and simulates a pulse, a further pump being driven by a reciprocating device whose frequency of oscillation is employed to create a pressure which indicates stroke rate. Stated otherwise, the invention contemplates a method of indicating mechanical-oscillation frequency, which method comprises converting the frequency into a proportional pressure or flow volume and measuring this pressure or volume. More specifically, the above illustrated method of the invention comprises controlling the pumping of a pressure medium in accordance with the frequency of oscillation of a reciprocating system and indicating the quantity of medium pumped or the pressure resulting therefrom in order to indicate the frequency of oscillation of the reciprocation system.

In order that the gauge or indicator 20 of the apparatus be adapted for directly indicating stroke rate, a calibration between the position of pointer 120 and units of the scale 128 is necessary. This calibration can be provided by calculation but is best determined for a given system by empirical methods.

It will be noted that the invention has provided a stroke rate indicator for which absolutely no electrical power is necessary. The stroke rate indicator of the invention avoids therefore the difficulties inherent in employing electrical power in closed oxygen containing systems. It will, moreover, be noted that the invention has provided a stroke rate indicator especially adapted for use with reciprocating drives employed to operate pumps in extracorporeal blood circulation systems.

The apparatus of the invention is admirably suited for use in compact portable arrangements and since the invention employs simple components which are operated at way below rated capabilities, apparatus of the invention is susceptible of extended longevity.

It is further to be noted that the invention avoids the need for converting linear reciprocating motion into other types of mechanical motion such as, for example, the rotary type of motion employed for driving tachometers and the like.

There will now be obvious to those skilled in the art many modifications and variations of the structure and methods set forth above. These modifications and variations will not, however, depart from the scope of the invention if they lie within the scope of the following claims.

What is claimed is:

1. In an extracorporeal blood circulation device including a blood pump having a variable stroke rate and being adapted for pumping the blood thereby to simulate a pulse, and a reciprocating device coupled to and driving said pump; a stroke rate indicator comprising: means coupled to and reciprocated by said reciprocating device, pump means operatively disposed with respect to the first said means to be engaged and driven by the reciprocation of the latter to effect a discharge corresponding to the reciprocation of the first said means, and a gauge coupled to said pump means to indicate the discharge thereof thereby to indicate the reciprocation of the first said means, the indication of the reciprocation of the first said means indicating the operation of said blood pump, and, thereby, the stroke rate.

2. An indicator as claimed in claim 1, wherein the discharge of said pump means is pulsed, comprising snubber means coupled between said pump means and said indicator to accumulate and smoothen the discharge.

3. An indicator as claimed in claim 2, wherein said indicator is a pressure gauge measuring the pressure of said discharge in said snubber means.

4. An indicator as claimed in claim 1, wherein said pump means comprises a cylinder operatively disposed with respect to the first said means, a piston in said cylinder, a rod on one side of said piston and positioned to be engaged by the first said means for displacement of said piston, and a spring on the other side of said piston urging the latter to a normal position of rest, said cylinder being coupled to said indicator.

5. An indicator as claimed in claim 4, wherein the first said means is a rigid arm adapted to strike against said rod.

6. An indicator as claimed in claim 5, comprising unidirectional valves coupled to said cylinder for the admission of a pressure medium thereto and the discharge of said medium to said indicator.

7. An extracorporeal blood circulation system comprising a pump for pumping said blood, said pump being adapted to be operated by reciprocating forces effecting a variable stroke rate, a double acting piston and cylinder arrangement, a coupling device rigidly coupling said arrangement to said pump for operating the latter by transmitting reciprocating movement of said piston to said pump, means rigid on said device to be oscillated thereby along a determinable path of travel, further cylinders on opposite sides of said means and arranged along said path, pistons in each of the latter said cylinders, rods on the latter said pistons and extending towards each other along said path, said rods being engageable by said means for the operation of the pistons coupled to said rods, one-way valves coupled to said further cylinders for the admission of air thereto, further one-way valves coupled to said further cylinders for the discharge of air therefrom, a snubber coupled to said further valves for smoothing the flow of air therefrom, and a gauge coupled to said snubber for indicating the pressure of the air passing therethrough.

8. A system as claimed in claim 7, wherein said snubber comprises a vertical tube coupled to said further valves for guiding the air in an upwards direction and a cap loosely fitted on said tube, said cap yieldably permitting the flow of air through said tube to damp pulsations thereof.

References Cited in the file of this patent

UNITED STATES PATENTS

| 2,059,803 | Mann | Nov. 3, 1936 |
| 2,272,836 | Gerdien | Feb. 10, 1942 |
| 2,659,368 | Gibbon et al. | Nov. 17, 1953 |
| 2,925,814 | Vibber et al. | Feb. 23, 1960 |

FOREIGN PATENTS

| 81,293 | Germany | May 20, 1895 |

OTHER REFERENCES

Taylor: "How to Stop Pulsation," Mar. 8 and 15, 1954, 73–70, pages 101–105, 112–114, 117, 150 of Oil and Gas Journal.